United States Patent Office 2,942,680
Patented June 28, 1960

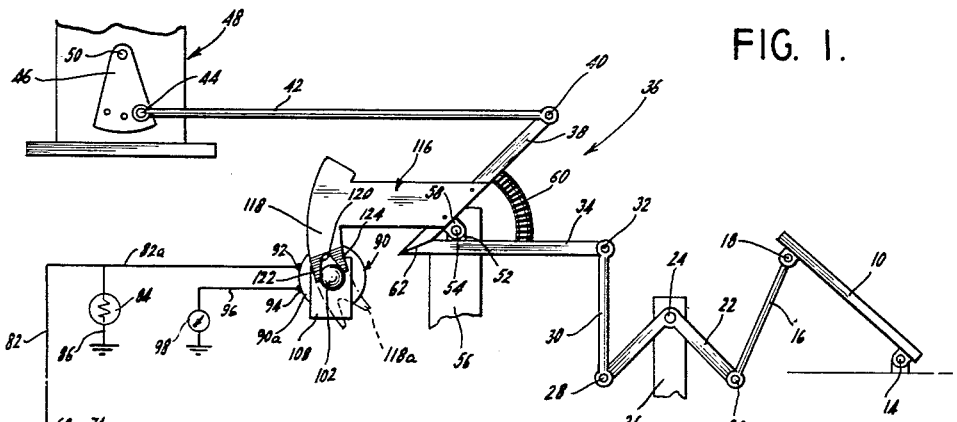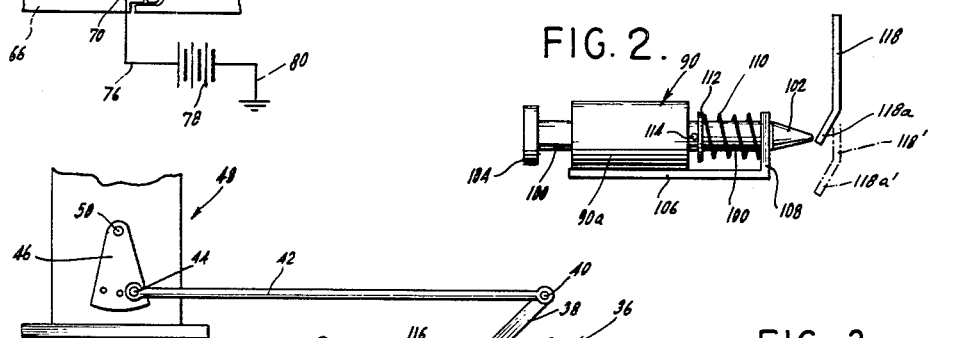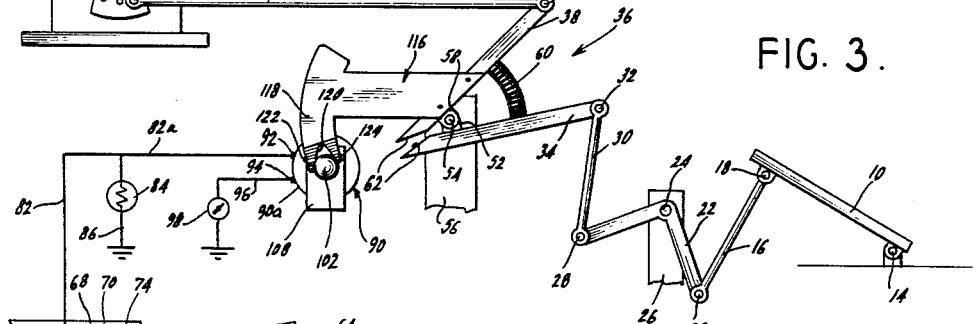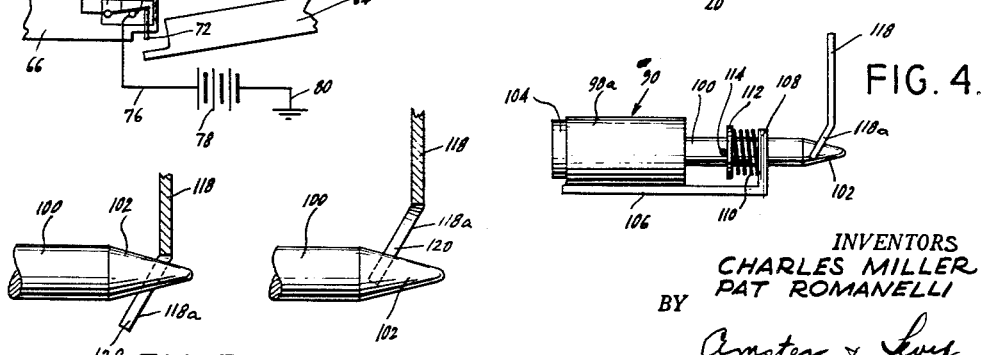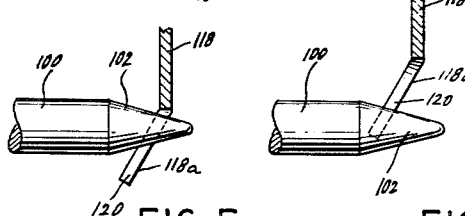

2,942,680

DOOR-OPERATED SAFETY DEVICE FOR AUTOMOTIVE ACCELERATION SYSTEMS

Charles Miller and Pat Romanelli, Bronx, N.Y., assignors to Ram Domestic Products Company, Englewood, N.J., a partnership Filed Mar. 16, 1959, Ser. No. 799,509

6 Claims. (Cl. 180—82)

The present invention relates to improvements in automotive safety devices and in particular relates to a novel and improved safety device for an automobile which will prevent acceleration of the vehicle when a door is in open position.

With the widespread use of automatic transmissions in automobiles, it has become unnecessary to shift into gear from a neutral position. This has given rise to a safety hazard since automobiles are often parked with the transmission in "drive" position while passengers enter or leave the vehicle. If the driver accidently steps on the accelerator pedal while the automatic transmission is in such "drive" position, the automobile will move and accelerate at the very time that the passenger is entering or leaving. This could obviously result in serious injury to the passenger. Another common hazard is caused by the driver sitting in the automobile with the motor running, the automatic transmission in "drive" position, and the hand brake off. Frequently, the driver will inadvertently step on the accelerator pedal, causing the automobile to start rapidly out of control, and resulting in damage to the automobile.

The principal object of the present invention is the provision of a safety device for automobiles having automatic transmissions which will prevent the accelerator pedal from being operated while any of the automobile doors is open.

Another object of the invention is the provision of a safety device of the character described which automatically locks an intermediate portion of the carburetor linkage as soon as a door of the automobile is opened, and which is self-compensating to provide a snug engagement with such linkage despite the various idling positions which the linkage may be caused to assume by the automatic choke system of the automobile.

A further object of the invention is the provision of a safety device of the character described which can be connected to the door-light switch system of most automobiles and which includes few relatively inexpensive parts so that it is economical in manufacture. The safety device may be built within the automobile, or may be easily installed as a separate unit in most standard automobiles.

In accordance with the invention, there is provided in an automotive vehicle a solenoid which is connected in the battery circuit through a door switch in such a manner that when the door is opened, the solenoid is energized and its plunger thrust outwardly. The plunger is associated with a movable portion of the carburetor linkage so that its outwardly-thrust plunger blocks this linkage and thereby prevents movement of the accelerator pedal from being transmitted to the carburetor. For this purpose, the carburetor linkage includes a bell-crank lever, the arms of which are mounted for independent movement, with spring means normally coupling the arms for movement in unison. One of the arms of the bell-crank lever is positioned to be engaged and held by the solenoid plunger when the door is opened so that the other bell crank arm can move against tension of the spring means, with the result that while the accelerator pedal can be depressed when an automobile door is open, such depression will have no effect on the carburetor, and the automobile will not accelerate.

Additional objects and advantages of the invention will become apparent during the course of the following specification when taken in connection with the accompanying drawings, in which:

Figure 1 is a schematic view of an automotive carburetoar linkage incorporating the safety system of the present invention and including an electrical circuit which is also shown schematically, the system being shown in a nonoperative position with the vehicle doors closed;

Figure 2 is an enlarged side elevational view of the solenoid employed in the safety system, the solenoid being shown in a de-energized position, and a portion of the locking arm of the carburetor linkage being shown in relation thereto;

Figure 3 is a schematic view similar to Figure 1, but showing the vehicle door opened, the solenoid energized, the carburetor linkage blocked, and the accelerator pedal in a depressed position;

Figure 4 is an enlarged elevational view of the solenoid similar to Figure 2, but showing the solenoid in an energized condition and its plunger in engagement with the lower portion of the locking arm of the carburetor linkage; and Figures 5 and 6 are enlarged elevational views of the free end portion of the solenoid plunger, showing the engagement of this plunger portion with the locking arm lower portion in two different vertical positions of the locking arm.

Referring in detail of the drawings, and in particular to Figure 1, there is shown a form of carburetor linkage conventionally used at present in automobiles having automatic transmissions. The automobile accelerator pedal 10 is mounted in the usual manner by pivot 14 on the floor-board 12 of the automobile, and is connected at its free upper end to a link 16 by pivot 18. At its bottom end the link 16 is connected by pivot 20 to one arm of a bell crank lever 22.

The bell crank lever 22 is mounted intermediate its ends by pivot 24 on a fixed portion 26 of the automobile frame, and its other arm is pivotally connected at 28 to a link 30. The link 30 is connected at its other end by a pivot 32 to one arm 34 of a bell-crank lever 36, the other arm 38 of which is connected by pivot 40 to one end of a rod 42. The other end of rod 42 is connected by pivot 44 to the actuating lever plate 46 of the carburetor 48. The actuating lever plate 46 is fixed in the usual manner to the carburetor shaft 50 for turning of shaft 50 to actuate the carburetor when the plate 46 is turned.

When the foot pedal 10 is depressed, the link 16 is moved downwardly, causing the bell-crank lever 22 to turn about its pivot 24 in a clockwise direction and therefore raise link 30. As link 30 rises, it carries the end of bell-crank lever arm 34 upwardly, turning bell-crank lever 36 in a counter-clockwise direction and causing arm 38 to move the rod 42 forwardly (or to the left as viewed in Figure 1) and thereby turn the carburetor shaft 50 in a clockwise direction through the lever plate 46. This turning movement of the carburetor shaft 50 will actuate the carburetor 48 to feed fuel to the automobile engine and cause the automobile to accelerate.

The linkage described above is the conventional carburetor linkage and provides a direct coupling between the accelerator pedal and the carburetor. In accordance with the present invention, the linkage is somewhat modified in that the bell-crank lever 36 is made with its arms 34 and 38 mounted for independent movement, and the bell-crank lever 36 is further coupled to the automatic safety device which regulates its effective movement as part of the linkage.

As can been seen in Figure 1, the arm 34 has an extension lug or ear 52 which is turnably mounted on a pivot shaft 54, the latter being mounted on a fixed portion 56 of the automobile frame. Similarly, the arm 38 has an extension lug or ear 58 which is also turnably mounted on pivot shaft 54, with the result that the arms 34 and 38 are independently turnable about said pivot shaft 54.

Intermediate their ends, the arms 34 and 36 are connected by a coiled compression spring 60 which normally urges the free ends of the arms 34 and 36 away from each other. The ends of the arms 34 and 36 adjacent the pivot shaft 54 are each provided with a mitered terminal surface 62. The miter surfaces 62 face each other and abut flushly under the action of spring 60, so that in the normal position of the bell-crank lever 36, shown in Figure 1, the arms 34 and 36 meet at an angle of approximately 45 degrees.

The compression spring 60 is of sufficient strength to maintain the arms 34 and 38 in their position of Figure 1 during normal operation of the carburetor linkage so that when the accelerator pedal 10 is depressed, the bell-crank lever 36 drives the rod 42 to actuate the carburetor. In accordance with the present invention, however, the bell-crank lever 36 is associated with blocking means which become effective when a door of the vehicle is opened and which prevents the arm 38 from being moved, the arm 34 then moving relative to the arm 38, against the tension of spring 60, to permit the accelerator pedal 10 to be depressed without affecting the carburetor.

Figure 1 also shows a portion of one of the automobile doors 64 which in closed position fits into a recessed portion of the automobile chassis which serves as the door jamb 66. Mounted within the door jamb 66 is a plunger-type switch 68 which is normally included in the automobile structure for the purpose of illuminating a door light or dome light 84 when the door is opened. The switch 68 includes a movable switch arm 70 having a terminal plunger piece 72 which projects through the body of the door jamb 66 in a position to be engaged by the edge of the door 64, in the manner shown in Figure 1. The switch arm 70 is made of electrically-conductive material and is associated with a fixed contact 74, the latter being connected by lead 76 to the positive terminal of the automobile battery 78. The negative terminal of battery 78 is grounded through lead 80.

The movable switch arm 70 is connected through lead 82 to one terminal of the door or dome light 84, the other terminal of which is grounded through lead 86. The switch arm 70 is made of spring material or is otherwise spring biased in a downward direction, as viewed in Figure 1, so that the switch arm 70 is normally urged into engagement with the contact 74 to close the battery circuit through the door light 84. When the door 64 is in open position, as shown in Figure 2, therefore, the door light 84 is illuminated. When the door 64 is closed, as shown in Figure 1, it engages and presses inwardly the plunger member 72, moving the switch arm 70 away from the fixed contact 74 and interrupting the battery circuit to the light 84.

The safety system of the present invention includes a solenoid 90 which is wired into the door light circuit of the automobile. One terminal 92 of the solenoid 90 is connected to an extension 82a of the lead 82. The other solenoid terminal 94 is connected by lead 96 to ground through the automobile ignition switch 98. It will thus be apparent that while the door light 84 and solenoid 90 will be energized by opening the door 64 only when the ignition switch 98 is closed.

The solenoid 90 is shown in detail in Figures 2 and 4, and has a plunger 100 which has a conical front end 102. At its rear end, the plunger 100 carries a fixed plate 104 which abuts the rear surface of the solenoid casing 90a when the plunger 100 is in fully-extended position, as shown in Figure 4, to limit the forward movement of said plunger 100.

The solenoid casing 90a is fixedly mounted on a bracket 106 having an upstanding front wall 108 through which the forward end of plunger 100 may slide, as shown in Figures 1, 2 and 4. A compression spring 110 is seated at one end on the wall 108 and at the other end on a washer 112 which is held in position by a pin 114 projecting radially from an intermediate portion of the plunger 100. The spring 110 therefore normally urges the plunger 100 rearwardly to its retracted position of Figure 2. When the solenoid 90 is energized, the plunger is thrust forwardly against tension of the spring 110 to its extended position of Figure 4 in which the plunger plate 104 is in abutment with the rear of the solenoid casing 90a.

A locking arm 116 is affixed to the bell-crank lever arm 38, the locking arm 116 having a depending extension 118. The bottom free end portion 118a of the extension 118 is bent laterally, as shown in Figures 4, 5, and 6, at an angle of approximately 35 degrees with the plane of the extension 118. The bottom free end extension portion 118a is also provided with a tapered slot 120 defining a pair of legs 122 and 124 in the locking arm extension 116, as shown in Figures 1 and 3.

The operation of the assembly is as follows:

When the ignition switch 98 is closed to start the automobile engine, the battery circuit to the solenoid 90 would be completed. However, if the automobile door 64 is closed, it opens door switch 68 through plunger 72. The solenoid 90 is so positioned relative to locking arm 116, that when said solenoid is de-energized, the spring 110 urges the plunger 100 rearwardly to the inactive position of Figure 2 in which it is clear of the locking arm 116.

Thus, when the automobile engine is running and the automobile doors are closed, the solenoid 90 is de-energized and its plunger 100 out of the path of travel of the locking arm 116. When the accelerator pedal 10 is depressed, the accelerator linkage 16, 22, 30 is actuated, causing the bell crank lever 36 to pivot as a unit with its arms maintaining their relative position shown in Figure 1. The bell crank lever arm 38 carries with it the locking arm 116, the latter pivoting downwardly about the pivot 54, and moving to the position shown in broken line at 118′ in Figures 1 and 2. As shown in Figure 2, the conical forward end 102 of the solenoid plunger 100 is spaced rearwardly from the lower terminal position of the locking arm 116, so that in its downward pivoting movement the locking arm is free of the plunger 100 and does not engage the same. The automobile engine is thus accelerated in the usual manner, the bell crank lever 36 moving as a unit to push rod 42 and thereby turn the actuating lever plate.

If, however, the automobile door 64 is in open position, the engine cannot be accelerated. The spring biased switch arm 70 is urged into engagement with the contact 74, and, when the ignition switch 98 is closed, the battery circuit is completed through the solenoid 90. This energization of solenoid 90 thrusts the plunger 100 fully outwardly, against tension of spring 110, until the plunger plate 104 engages the rear surface of the solenoid casing 90a. The plunger front end 102 is now moved forwardly into contact with the locking arm 116, as indicated in Figure 4, the conical portion 102 moving into the slot 120 and being snugly embraced by the legs 122 and 125 of the extension 118. The locking arm 116 is therefore restrained from pivoting movement, as is the bell-crank arm 38.

If the accelerator pedal 10 is now depressed, the bell crank lever arm 34 will be turned about pivot 54 through the accelerator linkage 26, 33, and 30, but the bell crank lever arm 38 cannot move because of the engagement between solenoid plunger 100 and locking arm extension 118. The lever arm 34 therefore moves upwardly toward the immovable lever arm 38, against the tension of spring 60, as shown in Figure 3. Thus, while the accelerator pedal may be depressed, its movement is not transmitted to the carburetor and does not result in acceleration of the vehicle.

The bend of the locking arm bottom free end portion 118a, the taper of the slot 120, and the taper of the conical end portion 102 of solenoid plunger 100 are all so regulated as to provide a perfect snug fit of the plunger 100 with the locking arm extension 118 regardless of the linkage position. Since automatic chokes are customarily used in most motor vehicles, the carburetor adjustment is automatically varied according to engine conditions, and therefore the position of the carburetor shaft 50, actuating lever plate 46 and the carburetor linkage is correspondingly varied. As a result, the vertical position of the locking arm extension 118 will change from time to time, depending on whether the engine is cold or hot. When the door of the automobile is opened, the solenoid plunger 100 will always be thrust outwardly to the same fully-extended position shown in Figure 4. It is essential that said plunger engage and make a snug fit with the locking arm extension 118 regardless of the vertical position of the latter, in order to insure that there will be no play between these parts and that not even the slightest degree of depression of the accelerator pedal will be transmitted to the carburetor.

The slot 120 is inwardly tapered as shown, and the bottom free end portion 118a of locking arm extension 118 is bent rearwardly as shown, in order to insure that the plunger 100 and locking arm extension 118 will always interengage snugly when the automobile door is opened with the engine idling. Figure 5 illustrates one vertical position of the locking arm extension 118 which corresponds to a "fast idling" condition of a cold engine with an automatic choke. In this position, forward portion of the conical end 102 of the solenoid plunger 100 will engage the legs 122 and 124 bordering the tapered slot 120 at the upper portion of said slot. Stated somewhat differently, the narrow portion of the conical plunger end 102 engages the corresponding narrow portion of the slot 120. Figure 6 illustrates another position of the locking arm extension 118 which is higher than the position of Figure 5. In this position, when the plunger 100 is again moved to the same fully-extended position, the rear wide portion of the conical end 102 engages the upper wide portion of the slot 120. As is evident from a comparison of Figures 5 and 6, this constant snug interengagement of the parts is made possible by the rearwardly-bent inclination of the lower portion 118a of locking arm extension 118.

It is contemplated that in a standard automobile, each door will be provided with a switch 68 connecting the solenoid 90 to the battery circuit. Thus, if the engine is idling and any door is opened, an accidental depression of the accelerator pedal will have no effect on the carburetor, and the vehicle will not be set in motion.

Although the invention has been described as employed in connection with automatic transmissions, it will be understood that the safety assembly of the invention can be advantageously employed in vehicles having magnetic vacuum clutches and other types of automatic clutch assemblies.

While a preferred embodiment of the invention has been shown and described herein, it is obvious that numerous additions, changes and omissions may be made in such embodiment without departing from the spirit and scope of the invention.

What we claim is:

1. For use in an automotive vehicle having an accelerator system including an accelerator pedal, a carburetor, and a linkage operatively connecting said accelerator pedal with said carburetor, a locking device associated with at least one of the doors of said vehicle and with said linkage for blocking movement of said linkage and preventing said vehicle from being accelerated when said door is open, said locking device comprising an electrically-operated blocking member and an electrical energization circuit for said blocking member including switch means associated with and operable by said vehicle door, said blocking member having a de-energized position in which it is spaced from said carburetor linkage and an energized position in which it engages and blocks the movement of a portion of said carburetor linkage, whereby to prevent movement of said accelerator pedal from being transmitted to said carburetor, said switch means having a normally active position in which it completes said circuit to energize said blocking member and being positioned to be engaged and inactivated by said vehicle door when the latter is closed to interrupt the energization circuit of said blocking member.

2. For use in an automotive vehicle having an accelerator system including an accelerator pedal, a carburetor, and a linkage operatively connecting said accelerator pedal with said carburetor, a locking device associated with at least one of the doors of said vehicle and with said linkage for blocking movement of said linkage and preventing said vehicle from being accelerated when said door is open, said locking device comprising a solenoid having a plunger and an electrical energization circuit for said solenoid including a switch mounted adjacent said vehicle door, said solenoid plunger having an inoperative position in which it is spaced from said carburetor linkage, said solenoid upon energization by said electrical circuit being adapted to move said plunger to an operative position in which it engages and holds a portion of said carburetor linkage, whereby to prevent movement of said accelerator pedal from being transmitted to said carburetor, said switch having a normally closed position in which it completes said energization circuit to maintain said plunger in its operative position and being positioned to be engaged and opened by said vehicle door when the latter is closed to interrupt the solenoid energization circuit.

3. For use in an automotive vehicle having an accelerator system including an accelerator pedal, a carburetor, and a linkage operatively connecting said accelerator pedal with said carburetor, a locking device associated with at least one of the doors of said vehicle and with said linkage for blocking movement of said linkage and preventing said vehicle from being accelerated when said door is open, said locking device comprising a solenoid having a plunger, a locking arm connected to a portion of said carburetor linkage adapted to be moved therewith in a direction toward said solenoid when said accelerator is depressed, and an electrical energization circuit for said solenoid including a switch mounted adjacent said vehicle door, said solenoid plunger having a normal inoperative position in which it is spaced from the path of movement of said locking arm, said solenoid upon energization by said electrical circuit being adapted to move said plunger to an operative position in which it engages and holds said locking arm to restrain movement of the connected portion of the accelerator pedal from being transmitted to said carburetor, said switch having a normally closed position in which it completes said energization circuit to maintain said plunger in its operative position and being positioned to be engaged and opened by said vehicle door when the latter is closed to interrupt the solenoid energization circuit.

4. A locking device according to claim 3 in which said solenoid plunger has a tapered forward free end portion and said locking arm has a lower free end portion which is inclined in the direction of said solenoid, the locking arm free end portion having a tapered slot therein matching the tapered free end portion of the solenoid plunger, said plunger free end portion entering said slot and making a snug fit therein when said solenoid is energized.

5. A locking device according to claim 4 in which said carburetor linkage is associated with an automatic choke system of said automotive vehicle whereby said linkage and the connected locking arm will assume varied idling positions, said tapered slot, the tapered end portion of said solenoid, and the inclination of said locking arm free end portion being so proportioned as to provide a snug interengagement between said slot and said plunger regardless of the idling position of said locking arm.

6. For use in an automotive vehicle having an accelerator system including an accelerator pedal, a carburetor, and a linkage operatively connecting said accelerator pedal with said carburetor, a locking device associated with at least one of the doors of said vehicle and with said linkage for blocking movement of said linkage and preventing said vehicle from being accelerated when said door is open, said locking device comprising a solenoid having a plunger, a bell-crank lever forming part of said carburetor linkage and comprising a pair of arms mounted for independent pivoting movement, and spring means biasing said arms away from each other for movement in unison when said linkage is actuated, a locking arm connected to the arm of said bell crank lever nearest to said carburetor and adapted to move with said arm in a direction toward said solenoid when said accelerator pedal is depressed, and an electrical energization circuit for said solenoid including a switch mounted adjacent said vehicle door, said solenoid plunger having a normal inoperative position in which it is spaced from the path of movement of said locking arm, said solenoid upon energization by said electrical circuit being adapted to move said plunger to an operative position in which it engages and holds said locking arm to restrain movement of the connected bell-crank lever arm, whereby to prevent movement of said accelerator pedal from being transmitted to said carburetor, said switch having a normally closed position in which it completes said energization circuit to maintain said plunger in its operative position and being positioned to be engaged and opened by said vehicle door when the latter is closed to interrupt the solenoid energization circuit.

References Cited in the file of this patent

UNITED STATES PATENTS

| | | |
|---|---|---|
| 1,299,979 | Malburg | Apr. 8, 1919 |
| 1,302,101 | Taylor | Apr. 29, 1919 |
| 1,736,189 | Demand | Nov. 19, 1929 |
| 2,034,233 | Hasselbaum | Mar. 17, 1936 |
| 2,740,947 | Davies | Apr. 3, 1956 |